United States Patent [19]
Whatley et al.

[11] Patent Number: 5,911,081
[45] Date of Patent: Jun. 8, 1999

[54] METHOD AND APPARATUS FOR SELECTIVELY INHIBITING POWER SHUTDOWNS BASED UPON THE NUMBER OF POWER SHUTDOWNS THAT AN ELECTRICAL DEVICE HAS BEEN EXPERIENCED

[75] Inventors: Terry Whatley, Nevada; Saeed Nowshadi, Fremont; Peter van der Linden, Los Altos; Robert R. Gianni, Los Gatos; Ron Melanson, Woodside, all of Calif.

[73] Assignee: Sun Microsystems, Inc., Palo Alto, Calif.

[21] Appl. No.: 08/851,308

[22] Filed: May 5, 1997

[51] Int. Cl.⁶ .................................................. G06F 1/00
[52] U.S. Cl. ............................. 395/750.03; 395/183.17; 395/183.2
[58] Field of Search ..................... 395/750.01–750.08, 395/182.01–184.01

[56] References Cited

U.S. PATENT DOCUMENTS

| | | | |
|---|---|---|---|
| 3,938,910 | 2/1976 | Douglas | 417/12 |
| 4,464,724 | 8/1984 | Gurr et al. | 364/528.26 |
| 4,466,584 | 8/1984 | Chevalier et al. | 242/344 |
| 4,742,476 | 5/1988 | Schwartz et al. | 701/30 |
| 5,420,571 | 5/1995 | Coleman et al. | 340/644 |
| 5,485,391 | 1/1996 | Lindstrom | 364/474.17 |
| 5,504,908 | 4/1996 | Ikeda | 395/750.01 |
| 5,515,312 | 5/1996 | Nakakuma et al. | 365/145 |

OTHER PUBLICATIONS

Sun Microsystems, Inc. manual entitled "Using Power Management", Revision A, Nov. 1995, Sun Microsystems, Inc., Mountain View, California, 63 pages total.

*Primary Examiner*—Thomas C. Lee
*Assistant Examiner*—Harold J. Kim
*Attorney, Agent, or Firm*—Beyer & Weaver, LLP

[57] ABSTRACT

Disclosed is a process and apparatus for controlling a power shutdown of an electrical device. The operations for controlling a power shutdown include determining a value MAX indicating a maximum number of safe power-on transitions that could have been experienced by the electrical device prior to a specified date. In addition, a threshold value P indicating a number of permissible power-on transitions prior to the specified date is determined from the value MAX. A value N indicating a number of power-on transitions that have occurred prior to the specified date is then determined. The power shutdown is inhibited if the value N is greater than the threshold value P, and otherwise allowed.

18 Claims, 4 Drawing Sheets

METHOD AND APPARATUS FOR SELECTIVELY INHIBITING POWER SHUTDOWNS BASED UPON THE NUMBER OF POWER SHUTDOWNS THAT AN ELECTRICAL DEVICE HAS BEEN EXPERIENCED

BACKGROUND

1. Technical Field

The present invention relates to a method and apparatus for controlling the power shutdown of an electrical component. More particularly, the invention relates to a method and apparatus for selectively inhibiting the power shutdown of an electrical component based upon a maximum number of safe power shutdowns performed to date.

2. Background of the Invention

Research indicates that a substantial amount of energy consumed by devices such as computers, computer monitors, and other electrical devices is consumed when the devices are not in use. It has therefore been common to include in such devices the capability of automatically shutting down the device when an extended period of non-use is detected. A typical period of non-use triggering such a shutdown is 30 minutes. In computer systems, such a shutdown is typically preceded by a state-saving operation so that the state of the system may be restored upon a subsequent startup.

Executive Order no. 12845, of Apr. 21, 1993 requires that federal agencies procure equipment that complies with the Environmental Protection Agency (EPA) "Energy Star" program, of which the automated power shutdown is a part. The changes to federal procurement process alone are estimated to save several million dollars in energy consumption and substantially reduce air pollutant and greenhouse gas emissions from electric utilities.

Although the automated shutdown has the benefit of reducing power consumption, it increases the number of power-on transitions experienced by the device, because use of the device following the shutdown requires re-application of power to the shutdown device prior to use. A device having a 30-minute trigger time, and that is frequently but intermittently used, for example, may experience between 20 to 40 power-on transitions a day. This is a considerable increase over a more typical one power transition per day, or per longer period, which would be in effect without the automatic shutdown capability.

It is known that the lifetime of electrical equipment is shortened by repetitive power-on transitions. Therefore, it is desirable to permit automated power shutdowns to save power, while managing the number of power shutdowns to prevent them from negatively impacting the lifetime of the equipment being powered down.

SUMMARY OF THE INVENTION

A method and apparatus is disclosed for controlling the power shutdown of an electrical device. A value MAX is determined that represents the maximum number of power-on transitions that could have been experienced by the electrical device prior to a specified date. A threshold value P is derived from MAX. The actual number N of power-on transitions that have occurred is determined. The power shutdown is inhibited if N exceeds the threshold P, and permitted otherwise.

In another aspect of the invention, the threshold P is equal to the value MAX. In yet another aspect of the invention, the threshold P is less than the value MAX.

In yet another aspect of the invention, the value MAX is determined by determining the total number M of safe power-on transitions in the expected life of the device, determining the present age of the device, and scaling the total number M by a ratio approximating the present age of the device divided by the expected life of the device. The number M may be obtained from a predetermined area of non-volatile memory whose location is set at time of manufacture; the value N may be obtained from a predetermined location in non-volatile memory that is incremented for each power-on transition.

DESCRIPTION OF THE DRAWINGS

The foregoing and other objects, aspects and advantages are better understood from the following detailed description of a preferred embodiment of the invention with reference to the drawings, in which.

DETAILED DESCRIPTION

Figure 1:
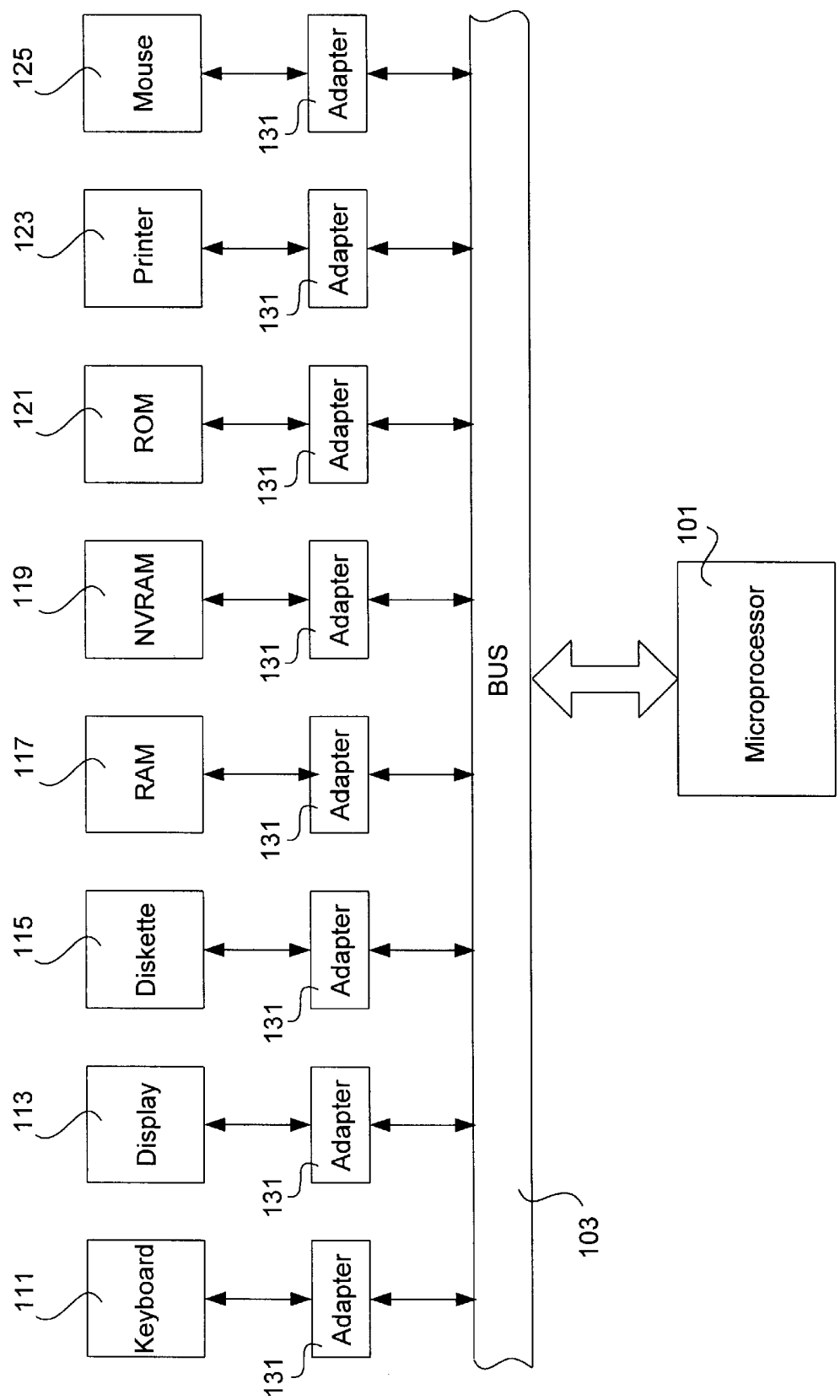
FIG. 1 depicts the architecture of a typical computer workstation in which the present invention may be embodied.

FIG. 1 depicts the architecture of a typical computer workstation, such as Sun Microsystems' SparcStation™, or a personal computer such as IBM PS/2, Apple Macintosh computer, in which the present invention may be embodied. Although the present invention will be exemplarily described as embodied in a workstation or personal computer, it may also be implemented in conjunction with any electrical component or device operating under control of a microprocessor.

The architecture depicted in FIG. 1 includes a microprocessor 101, which may be a Sun Microsystems Sparc microprocessor or other programmable microprocessor, such as a processor of the Intel x86 architecture, Motorola 680x0 architecture, Digital Equipment Corp. Alpha architecture. The microprocessor 101 is in communication with a bus 103 which comprises data lines, address lines and control lines. A plurality of input/output devices and/or memory storage devices 111–125 are in communication with bus 103 through adapters 131. The Random Access Memory (RAM) 117, Non-Volatile Random Access Memory (NVRAM) 119 and Read-Only Memory (ROM) 121 and their corresponding adapters 131 are ordinarily included as standard equipment in a workstation or personal computer, although it is typical to provide the capability to add additional RAM 117 through plug-in expansion slots.

ROM 121 typically is configured to include a plurality of instructions for execution of microprocessor 101 during power-on of and during operation of the computer.

Figure 2:
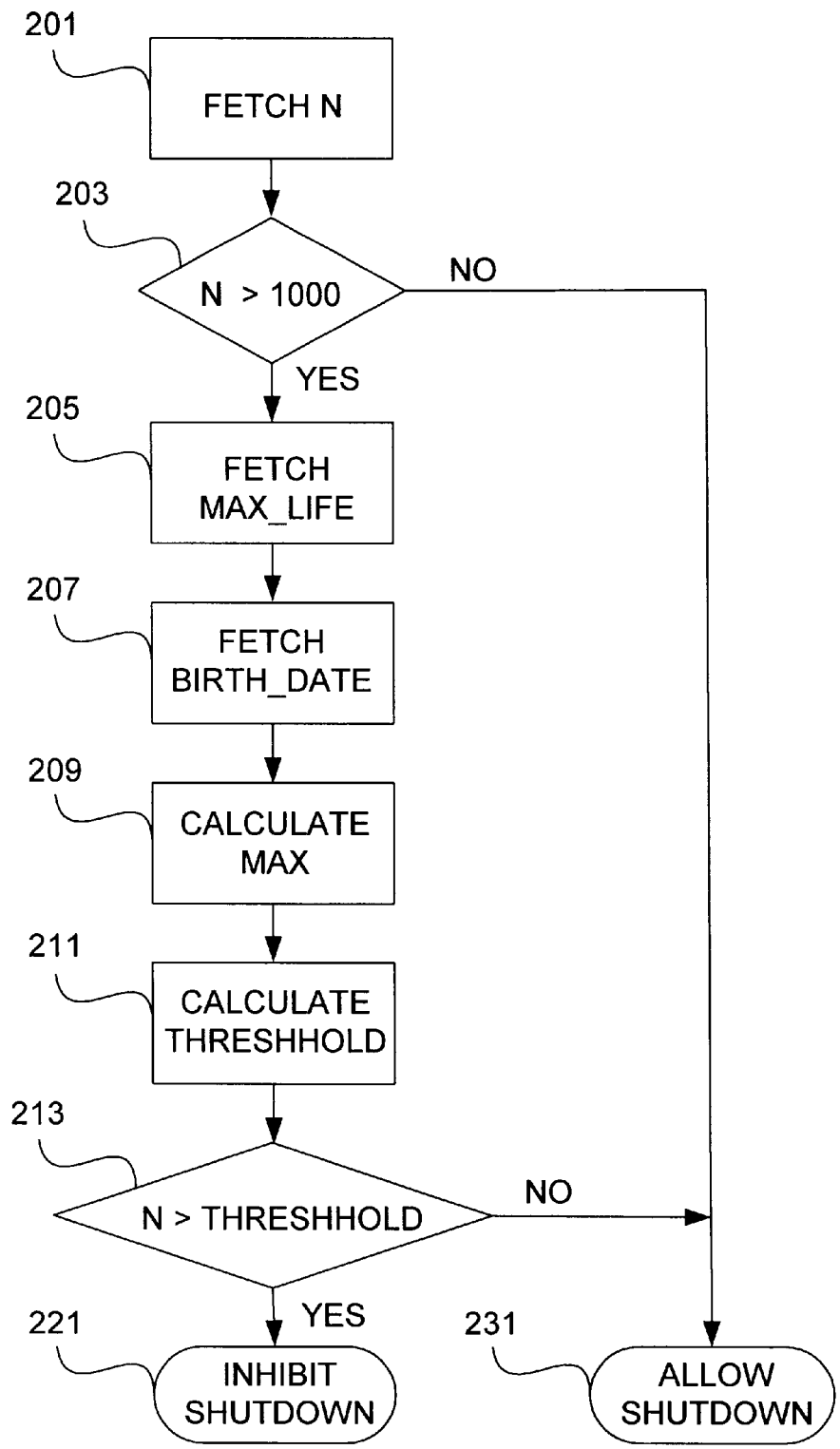
FIG. 2 is a flow diagram depicting an implementation of the present invention by a microprocessor executing an evaluation routine.

FIG. 2 is a flow diagram depicting an implementation of the present invention by microprocessor 101 executing an evaluation routine. The evaluation routine is called by the automatic shutdown process to determine whether the shutdown should proceed or if it should be inhibited to prevent excessive power transitions.

A value N represents a number of power-on transitions having to which the device has been subjected during its operational lifetime. In Step 201, the value N is fetched by the microprocessor from a predetermined storage location. The value N may be conveniently stored as, for example, a 32-bit unsigned integer. The storage location is preferably a location in NVRAM 119.

In Step 203, the value N is optionally compared to a predetermined constant C such as 1000. The constant C is representative of a number of power transitions that are believed to be substantially harmless to the device and that can be permitted without further calculation. If the value N is less than or equal to the constant C, the microprocessor 101 in Step 231 exits the evaluation routine with a signal indicating that the shutdown should continue. If the value N exceeds the constant C, the microprocessor continues with additional processing to determine whether the shutdown should be inhibited.

It will be noted that the comparison and decision in Step 203 may be omitted. Including the Step, however, allows for predictability during test periods after installation of new equipment and allows for verification of the automated shutdown procedure, which may be desired to be exercised frequently in the early life of the equipment.

In Step 205, the microprocessor fetches a value MAX_LIFE from a predetermined storage location. The value MAX_LIFE may be conveniently stored as, for example, a 32-bit unsigned integer. The storage location may be NVRAM 119 and initialized during manufacture of the device. Alternatively, the storage location may be a location in ROM 121, or a location in RAM 117 having been initialized by the device's operating system (OS) at startup time from constants in ROM 121 or specified as constants in OS code and specified during OS configuration. The value MAX_LIFE represents the number of power-on transitions that the shortest-lived component in the device is expected to have in the lifetime of the device. For example, the shortest-lived component of a workstation having an anticipated 5-year useful may be a microprocessor that is expected to be able to withstand 10,000 power-on transitions during that 5-year period. In such a case, the value MAX_LIFE will be set to 10,000.

In Step 207, the microprocessor fetches a value BIRTH_DATE from a predetermined storage location. The storage location for the value BIRTH_DATE may be NVRAM 119, but may instead be a location in ROM 121, or a location in RAM 117 having been initialized by the device's OS at startup time from constants in ROM 121 or specified as constants in OS code and specified during OS configuration. The value BIRTH_DATE represents the date on which the device is manufactured or put into operation. The value BIRTH_DATE may be conveniently stored as, for example, a 32-bit unsigned integer. One convenient way of expressing the date is to store the number of days since a recognized epoch date such as Jan. 1, 1970. For example, the date Jan. 1, 1970 may be denoted by the value 0, and Jan. 2, 1970 by the value 1, Jan. 1, 1971 by the value 366, etc.

In Step 209, the microprocessor calculates a value MAX representing the maximum acceptable number of power-on transitions to date in the expected life of the component. This value is determined by multiplying the value MAX_LIFE by a factor representing the ratio of the present age of the device in days to the anticipated lifetime of the device in days.

An example of the calculation of the value MAX will be helpful. Assume the device in question has a MAX_LIFE value of 10,000, indicating that it is safely capable of withstanding 10,000 power-on transitions in its life. Assume further that the device was manufactured on Jan. 12, 1997 and has an anticipated lifetime of 5 years (approximately 1826 days). The value MAX on Jan. 1, 2001 may be calculated as follows. The value BIRTH_DATE is stored as the value 9873, indicating the date Jan. 12, 1997 (9,873 days after the epoch date Jan. 1, 1970). The current date of Jan. 1, 2001 is calculated as the value 11323 (11,323 days from the epoch date). The age of the device is calculated as 11323−9873=1450. The anticipated lifetime of the device is 1826 days. The factor by which the value MAX_LIFE should be multiplied to obtain the value MAX is 1450/1826, or approximately 0.794. Therefore, the value MAX representing the number of maximum acceptable power-on transitions to date is 10000* 0.79408 or approximately 7941.

In Step 211, the microprocessor 101 derives a threshold value P from the value MAX. It is convenient to set the threshold value P equal to value MAX. However, if it is desirable to include an additional safety factor, P may be set to some value lower than MAX, e.g. the value MAX less a predetermined constant value, or the value MAX multiplied by a scaling factor such a 0.95. In the example, it will be assumed that the value P is set equal to the value MAX.

In Step 213, the microprocessor compares the value N representing the actual number of power-on transitions to date to the threshold value P. If the value N is less than or equal to the threshold value P, then an additional power transition is within the range believed to be acceptable for a device of the indicated age. Therefore, if the value N is less than or equal to the threshold value P, the microprocessor 101 in Step 231 exits the evaluation routine with a signal indicating that the shutdown should continue. If the value N exceeds the threshold value P, then an additional power-on transition would exceed the number of power transitions that the device should have by at this point in its life. Therefore, if the value N exceeds the threshold value P, the microprocessor 101 in Step 231 exits the evaluation routine with a signal indicating that the shutdown should be inhibited.

The process described depends on the initialization of the three values BIRTH_DATE, MAX_LIFE and N prior to practice of the invention. Typically, these values are initialized at time manufacture, although they may also be initialized by means of program code that sets values in NVRAM 119 during system installation. The value BIRTH_DATE is a 32-bit unsigned integer initialized to the number of days since an epoch date such as Jan. 1, 1970. The value MAX_LIFE is a 32-bit unsigned integer initialize to the number of power-on transitions that the shortest-lived component in the device is expected to have in the lifetime of the device. The value N is a 32-bit unsigned integer representing the number of power-on transitions, and is initialized to zero.

Figure 3:
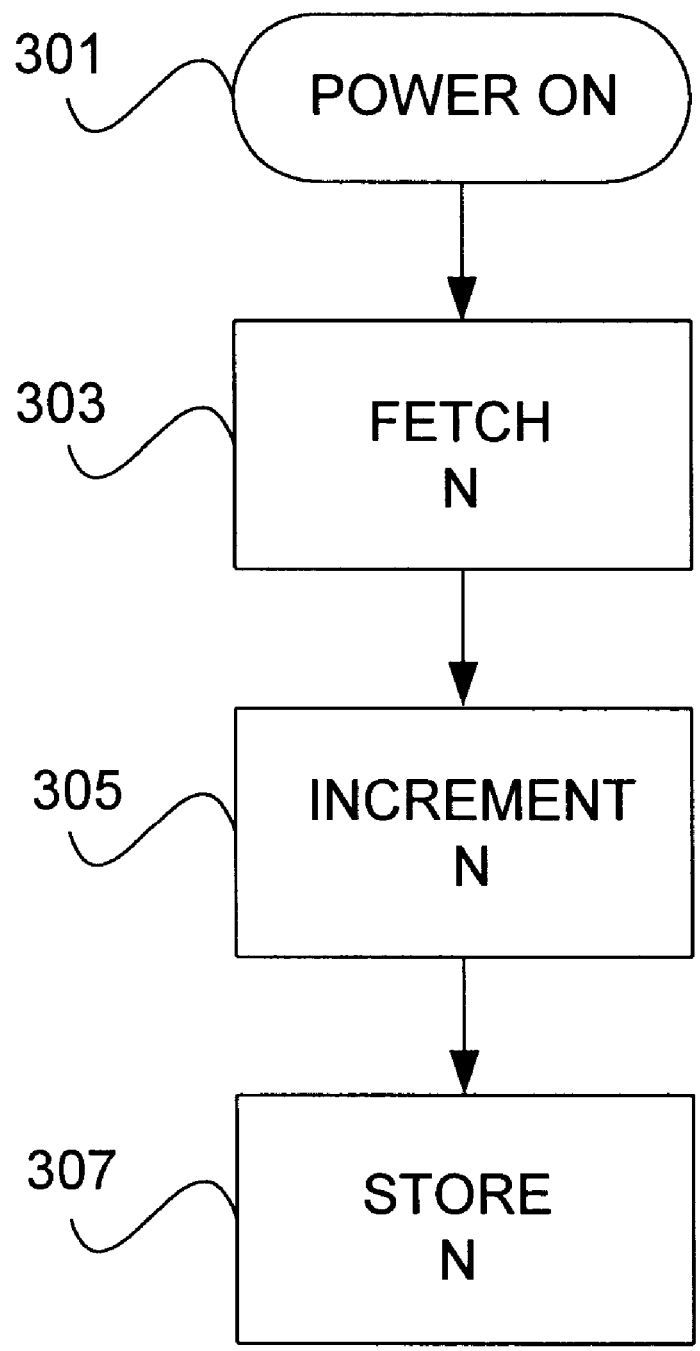
FIG. 3 is a flow diagram depicting a routine for incrementing the stored value N by a microprocessor during a power-on event.

In order to track the number of power-on transitions experienced in the lifetime of the device, the value N must be incremented for every power-on transition experienced by the device. FIG. 3 is a flow diagram depicting a routine for incrementing of the stored value N by microprocessor 101 during a power-on event. The routine is given control in Step 301 by the power-on sequence of the device. In Step 301, the microprocessor 101 fetched the value N from a predetermined location, such as a location in NVRAM 119. In Step 303, microprocessor 101 increments the fetched value N. In Step 305, the microprocessor stored the incremented value N at the predetermined location from which it was fetched. The updated value N is thereby made available for subsequent reference by the evaluation routine of FIG. 1.

Figure 4:
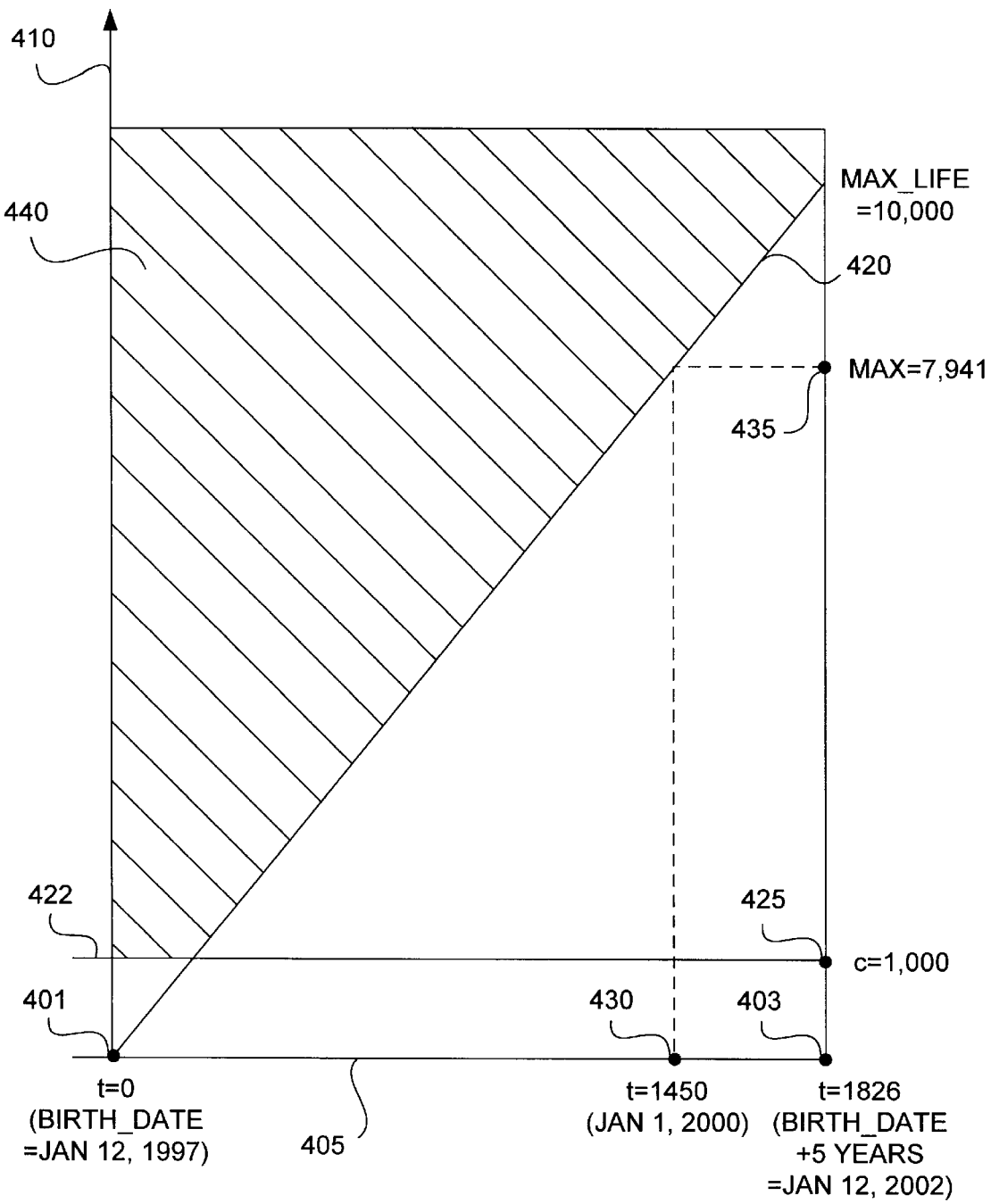
FIG. 4 graphically depicts an example of the present invention.

FIG. 4 graphically depicts an example of the present invention. The previously described example is used. The horizontal axis 405 represents time. Horizontal axis 405 begins at point 401 corresponding to the BIRTH_DATE of the device (in this example,) and extends through point 403 corresponding to the point in time that represents the end of the device's expected life time. In this example, the BIRTH_DATE represented by point 401 is Jan. 12, 1997, and the end-of-life point represented by point 403 is 5 years (1826 days) from manufacture, or Jan. 12, 2002.

Vertical axis 410 represents the number of power-on transitions. Vertical axis 410 begins at zero and extends to the value MAX_LIFE, which in this example represents 10,000 power-on transitions in the lifetime of the device.

Sloped line 420 represents the value MAX indicating the maximum permissible power-on transitions to date, graphed against time. Horizontal line 422 represents the value of constant C 425, which, in this example, is set to 1000.

In the example given, the object is to determine whether a power shutdown should be inhibited on Jan. 1, 2001. Jan. 1, 2001 corresponds to a value 1450, as shown by point 430. The MAX_LIFE value 10000 is scaled by the ratio 1450/1826 to yield a MAX value of 7941 (10000×1450/1826= 7941), as shown by point 435. Thus, if the number N of power-on transitions to date is less or equal to than 7941, the shutdown will be allowed to continue; if the number N of power-on transitions to date exceeds 7941, the shutdown will be inhibited. It will be seen that region 440, having a lower bound formed by the greater of sloped line 420 and horizontal line 422, therefore, represents a region in which a shutdown will be inhibited.

The present invention is particularly well suited to being provided in the form of a computer program product embodied on machine-readable media such as a magnetic disk, a CD-ROM, a field-installable chip such as a ROM, PROM, EPROM or EEPROM, or the like.

While various embodiments of a preferred embodiment have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method of controlling a power shutdown of an electrical device, comprising the steps of:
   determining a value MAX indicating a maximum number of safe power-on transitions that could have been experienced by the electrical device prior to a specified date;
   determining from the value MAX a threshold value P indicating a number of permissible power-on transitions prior to the specified date;
   determining a value N indicating a number of power-on transitions that have been experienced by the electrical device prior to the specified date; and
   inhibiting the power shutdown if the value N is greater than the threshold value P, and allowing the power shutdown otherwise.

2. The method of claim 1 wherein the threshold value P is equal to the value MAX.

3. The method of claim 1 wherein the threshold value P is less than the value MAX.

4. A method of controlling a power shutdown of an electrical device, comprising the steps of:
   determining a value MAX indicating a maximum number of safe power-on transitions that could have been experienced by the electrical device prior to a specified date;
   determining from the value MAX a threshold value P indicating a number of permissible power-on transitions prior to the specified date;
   determining a value N indicating a number of power-on transitions that have been experienced by the electrical device prior to the specified date; and
   inhibiting the power shutdown if the value N is greater than the threshold value P, and allowing the power shutdown otherwise, wherein the value MAX is determined by
      determining a total number M of total safe power-on transitions throughout an expected life of the electrical device;
      determining a present age of the electrical device; and
      scaling the total number M by a ratio approximately equal to the present age of the electrical device divided by the expected life of the electrical device.

5. The method of claim 4 wherein the total number M is obtained from a predetermined location in non-volatile memory, said predetermined location being set at time of manufacture.

6. The method of claim 1 wherein the value N is a number whose value is obtained from a predetermined location in non-volatile memory, the value N being incremented for each power-on transition.

7. An apparatus for controlling a power shutdown of an electrical device, comprising:
   a microprocessor configured to determine a value MAX indicating a maximum number of safe power-on transitions that could have been experienced by the electrical device prior to a specified date;
   wherein the microprocessor is further configured to determine from the value MAX a threshold value P indicating a number of permissible power-on transitions prior to the specified date;
   wherein the microprocessor is further configured to determine a value N indicating a number of power-on transitions that have been experienced by the electrical device prior to the specified date; and
   wherein the microprocessor is further configured to inhibit the power shutdown if the value N is greater than the threshold value P, and to allow the power shutdown otherwise.

8. The apparatus of claim 7 wherein the threshold value P is equal to the value MAX.

9. The apparatus of claim 7 wherein the threshold value P is less than the value MAX.

10. An apparatus for controlling a power shutdown of an electrical device, comprising:
    a microprocessor configured to determine a value MAX indicating a maximum number of safe power-on transitions that could have been experienced by the electrical device prior to a specified date;
    wherein the microprocessor is further configured to determine from the value MAX a threshold value P indicating a number of permissible power-on transitions prior to the specified date;
    wherein the microprocessor is further configured to determine a value N indicating a number of power-on transitions that have been experienced by the electrical device prior to the specified date; and
    wherein the microprocessor is further configured to inhibit the power shutdown if the value N is greater than the threshold value P, and to allow the power shutdown otherwise;

wherein the value MAX is determined by
 determining a total number M of total safe power-on transitions throughout an expected life of the electrical device;
 determining a present age of the electrical device; and
 scaling the total number M by a ratio approximately equal to the present age of the electrical device divided by the expected life of the electrical device.

11. The apparatus of claim 10 wherein the total number M is obtained from a predetermined location in non-volatile memory, said predetermined location being set at time of manufacture.

12. The apparatus of claim 7 wherein the value N is a number whose value is obtained from a predetermined location in non-volatile memory, the value N being incremented for each power-on transition.

13. A computer program product comprising a computer usable medium having computer readable code embodied therein controlling a power shutdown of an electrical device, said computer program product comprising:
 a software segment that determines a value MAX indicating a maximum number of safe power-on transitions that could have been experienced by the electrical device prior to a specified date;
 a software segment that determines from the value MAX a threshold value P indicating a number of permissible power-on transitions prior to the specified date;
 a software segment that determines a value N indicating a number of power-on transitions that have been experienced by the electrical device prior to the specified date; and
 a software segment that inhibits the power shutdown if the value N is greater than the threshold value P, and allowing the power shutdown otherwise.

14. The computer program product of claim 13 wherein the threshold value P is equal to the value MAX.

15. The computer program product of claim 13 wherein the threshold value P is less than the value MAX.

16. A computer program product comprising a computer usable medium having computer readable code embodied therein controlling a power shutdown of an electrical device, said computer program product comprising:
 a software segment that determines a value MAX indicating a maximum number of safe power-on transitions that could have been experienced by the electrical device prior to a specified date;
 a software segment that determines from the value MAX a threshold value P indicating a number of permissible power-on transitions prior to the specified date;
 a software segment that determines a value N indicating a number of power-on transitions that have been experienced by the electrical device prior to the specified date; and
 a software segment that inhibits the power shutdown if the value N is greater than the threshold value P, and allowing the power shutdown otherwise,
 wherein the value MAX is determined by
  determining a total number M of total safe power-on transitions throughout an expected life of the electrical device;
  determining a present age of the electrical device; and
  scaling the total number M by a ratio approximately equal to the present age of the electrical device divided by the expected life of the electrical device.

17. The computer program product of claim 16 wherein the total number M is obtained from a predetermined location in non-volatile memory, said predetermined location being set at time of manufacture.

18. The computer program product of claim 13 wherein the value N is a number whose value is obtained from a predetermined location in non-volatile memory, the value N being incremented for each power-on transition.

* * * * *